United States Patent [19]

Hengst et al.

[11] Patent Number: 5,029,970
[45] Date of Patent: Jul. 9, 1991

[54] ADAPTER FOR A LIGHT GUIDE FOR MEDICAL LASER APPARATUS INCLUDING SAFETY DEVICE

[75] Inventors: Thomas Hengst, Haar; Andreas Hahn, Sauerlach, both of Fed. Rep. of Germany

[73] Assignee: Messerschmitt-Bolkow-Blohm GmbH, Fed. Rep. of Germany

[21] Appl. No.: 473,164

[22] Filed: Jan. 31, 1990

[30] Foreign Application Priority Data

Jan. 31, 1989 [DE] Fed. Rep. of Germany ....... 3902807

[51] Int. Cl.$^5$ .......................... G02B 6/26; H01J 5/16; F21V 7/04
[52] U.S. Cl. ............................... 350/96.20; 350/96.18; 250/227.11; 362/32; 362/259
[58] Field of Search ............... 350/96.18, 96.20, 96.21, 350/96.22, 96.15; 250/227.11; 362/32, 259

[56] References Cited

U.S. PATENT DOCUMENTS

| 4,268,115 | 5/1981 | Slemon et al. | 350/96.20 |
| 4,669,819 | 6/1987 | Hengst et al. | 350/96.20 |
| 4,726,647 | 2/1988 | Kakii et al. | 350/96.20 |
| 4,747,656 | 5/1988 | Miyahara et al. | 350/96.20 |
| 4,762,389 | 8/1988 | Kaihara | 350/96.21 |
| 4,850,669 | 7/1989 | Welker et al. | 350/96.20 |
| 4,948,221 | 8/1990 | Yates | 350/96.20 |
| 4,978,186 | 12/1990 | Mori | 350/96.10 |
| 4,981,333 | 1/1991 | Hayes | 350/96.20 |

FOREIGN PATENT DOCUMENTS

| 3444824 | 6/1986 | Fed. Rep. of Germany ... 350/96.18 X |
| 3121287 | 12/1987 | Fed. Rep. of Germany ... 350/96.18 X |

Primary Examiner—Brian Healy
Attorney, Agent, or Firm—Evenson, Wands, Edwards, Lenahan & McKeown

[57] ABSTRACT

An adapter is disclosed which is suitable for connecting a light guide end piece to a coupling device of a light source of high intensity, particularly of a medical laser apparatus. The adaptor has a first section 2 which can be fixed in the coupling device 11 as well as a second section 3 which can be axially slid with respect to the first section 2. The second section 3 carries an input lens system 4 and, when the light guide end piece 20 is pushed in, is axially displaced from the first I to a second II position and locked there. Safety devices of the laser apparatus which prevent a start of the operation without any inserted light guide are switched only in the second position II.

17 Claims, 2 Drawing Sheets

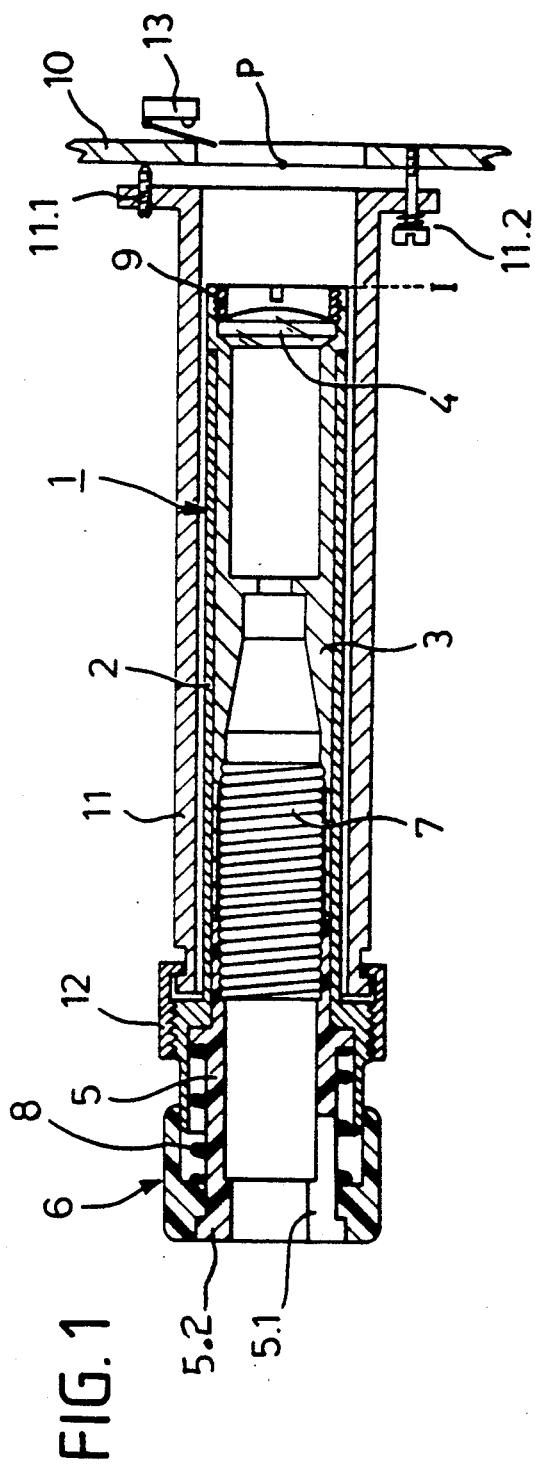
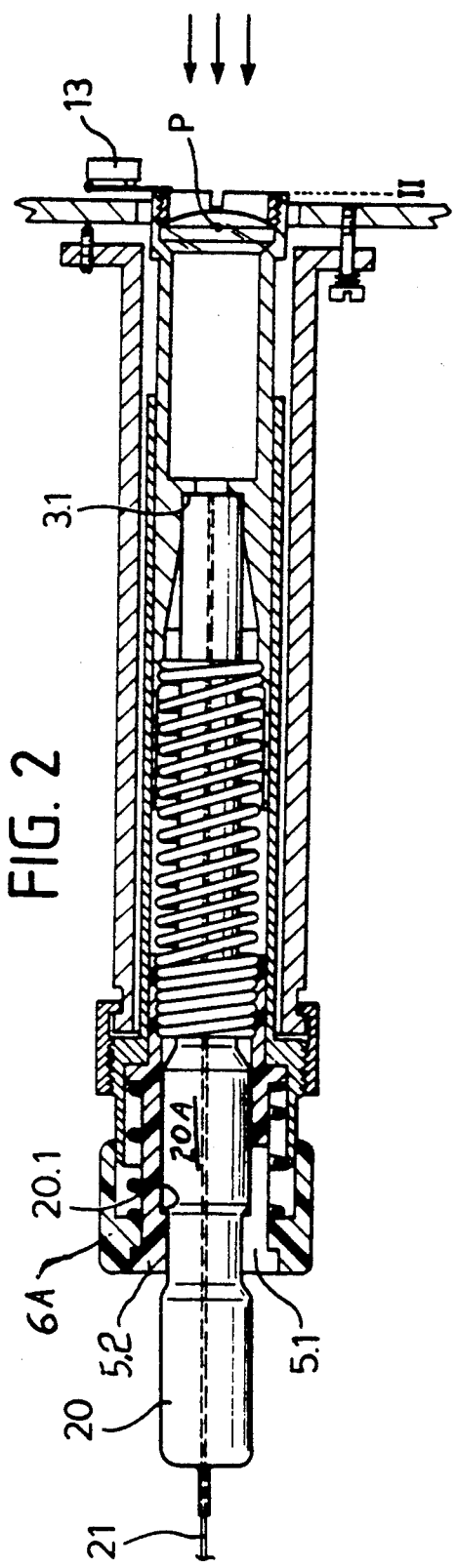

ADAPTER FOR A LIGHT GUIDE FOR MEDICAL LASER APPARATUS INCLUDING SAFETY DEVICE

BACKGROUND AND SUMMARY OF THE INVENTION

The invention relates to an adapter for the connection of a light guide end piece to a coupling device of a light source of high intensity.

From German Registered Utility Patent 84 16 748.3, a light guide input system is known for a medical laser apparatus, in which, at the end of an optical fiber, a cylindrical coupling piece is arranged which has an input lens system as well as various electrical contacts. The whole coupling part is fitted into a corresponding coupling device of the laser apparatus, the electrical contacts permitting the start of the operation of the laser apparatus only in the fully inserted condition.

The above-mentioned arrangement is too expensive for use as a one-way instrument. It was therefore suggested to simplify the coupling piece such that it can can be used as a one-way instrument together with the light guide (DE 3 444 824 C2). For the use of such "one-way light guides", an adapter is required which contains an input lens system and actuates the safety devices in the laser apparatus, so that the start of its operation is released. However, then there is the risk that the laser can also be operated when, although the adapter is in the inserted state in the laser, the light guide end piece is not inserted in the adapter.

It is therefore an object of the invention to provide an adapter for the connection of a light guide end piece to a coupling device of a light source of high intensity, particularly of a medical laser apparatus which is protected against operating errors as indicated above. This object is achieved according to preferred embodiments of the invention by means of an adapter for the connection of a light guide end piece to a coupling device of a light source of high intensity, wherein the adapter has a first section which can be fixed in the coupling device as well as a second section which is axially slidable with respect to the first section, wherein the first and/or the second section has an input lens system, and wherein the second section, is axially displaced and the light guide end piece as well as the second section are locked in the second position II when the light guide end piece is pushed in from a first I to the second position II.

The adapter according to the invention, which essentially consists of two axially slidable sections, actuates the safety devices of the laser apparatus only when a light guide end piece is pushed completely into the adapter. The adapter may therefore even remain in the laser apparatus constantly without the laser's being operable when the light guide end piece is pulled out.

Generally, the coupling device can be adjusted in the laser apparatus in order to be able to coaxially align its optical axis with the beaming direction of the laser. It will then be particularly advantageous for the input lens system of the adapter, when the light guide end piece is in the pushed-in state, to be brought into the pivot of the adjustment for the coupling device. As a result, when the coupling device is adjusted, a parallel offset of the input lens system is avoided.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic sectional view which shows an adapter inside the coupling device of a laser apparatus, without any inserted light guide end piece, constructed according to a preferred embodiment of the invention;

FIG. 2 is a view similar to FIG. 1 but showing the adapter inside the coupling device of a laser apparatus with an inserted light guide end piece.

DETAILED DESCRIPTION OF THE DRAWING

Figure 3:
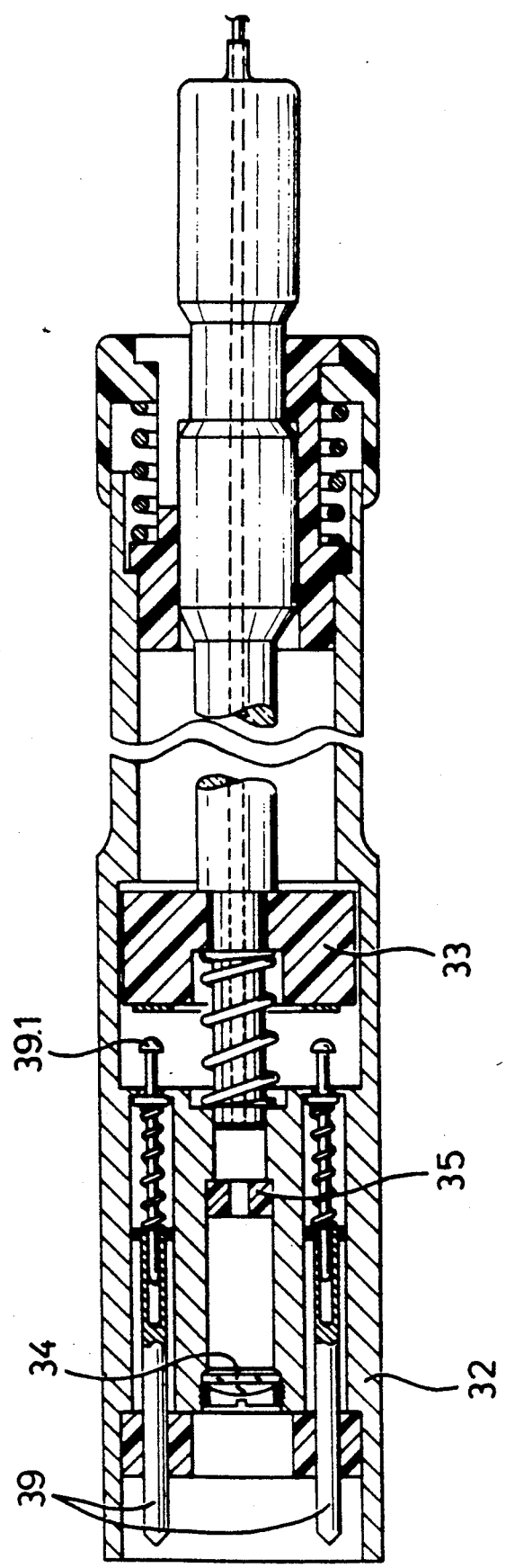
FIG. 3 is a schematic sectional view which shows another embodiment of an adapter in which the input lens system is arranged in the first section.

The adapter 1 shown in FIGS. 1 and 2 consists essentially of a first outer sleeve 2 and a second sleeve 3 which can be shifted axially inside this sleeve 2. The inner sleeve 3 carries an input lens system 4 on the side facing the laser apparatus 10. At the other end the sleeve is connected by way of a screw-shaped tension spring 7 with a holding piece 5 which supports itself against the outer sleeve 2 and is a component of a locking device 6 for the light guide end piece 20.

The adapter 1 is pushed into a coupling device 11 and is fixed there by means of a union nut 12. Without any pushed-in light guide end piece, the adapter, in this case, takes up position I in FIG. 1 inside the coupling device 11. When the light guide end piece 20 is now introduced into the adapter, its front face first strikes against a corresponding constriction 3.1 of the inner sleeve 3. When the light guide end piece 20 is pushed in farther, the inner sleeve 3 is now pushed out of the outer sleeve 2 against the force of the tension spring 7 until it reaches position II shown in FIG. 2. For accommodating insertion of enlarged section 20A the coupling ring 6A of the locking device 6 is axially pushed with respect to the extension 2 against the force of a pressure spring 8, so that the claws 5.2 of section 5 provided with slots 5.1, can be pressed radially toward the outside by means of a corresponding thickening of the light guide end piece 20, and can latch behind a ring-shaped step 20.1. After the release of the coupling ring 6A, this ring 6A snaps back into its shown position in which the light guide end piece is locked in the adapter and thus position II is held.

Shortly before the inner sleeve 3 reaches position II, the sensor arm of a microswitch 13 is contacted by the edge of the lens holding device 9 and is actuated when a further pushing-in takes place. Thus, the microswitch 13 detects the end of position II and therefore recognizes that a light guide end piece is disposed in the adapter. In the coupled-in condition of the light guide end piece 20, thus when position II is reached, the laser apparatus can become operative, in which case the parallel laser beams symbolized by the arrows, are focussed on the front face of the optical fiber 21 located centrically in the light guide end piece by means of the input lens system 4.

The coupling device 11 can be tilted and swivelled by means of three adjusting screws 11.1 and contact pressure elements 11.2 respectively distributed over the circumference, the pivot p of this tilting and swivelling motion being situated at the level of the input lens system when position II is reached. When the adjustment 11.1 takes place, the coupling device 11, together with the adapter 1, is rotated around point P and is adjusted to the maximum intensity of the laser light coupled into the optical fiber 21. A displacement of the coupling device into a direction which is vertical or perpendicular with respect to the axis of the beam will then no longer be required.

In the embodiment of an adapter shown in FIG. 3, the input lens system 34 is located inside a first section 32 which is pushed into a coupling device of a laser apparatus which is not shown, instead of a light guide end piece provided specifically for this purpose For this reason, even the first section 32 has electric contacts 39 which enter into contact with corresponding countersections in the coupling device and in principle represent an electrical extension of these countercontacts. The ends of these contacts have elastic tips 39.1 which are disposed opposite an axially slidable second section 33. When a light guide end piece is pushed in according to FIG. 1 or 2, the second section 33 is pushed in the direction of the contract tips 39.1 from a first into a second position in which case, when the second position is reached, it bridges the contacts 39 and thus triggers a safety device. In the second position, the front face of the light guide end piece comes in contact with a stop 35 which is positioned such that the light guide is situated in the focus of the lens system 34. The fixing of the light guide end piece will then take place in the same manner as in FIG. 2.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An adapter for the connection of a light guide end piece to a coupling device of a light source of high intensity, wherein the adapter has a first section which can be fixed in the coupling device as well as a second section which is axially slidable with respect to the first section, wherein one of the first and second sections has an input lens system, wherein the second section is axially displaceable with respect to the first section between first and second positions, wherein the light guide end piece as well as the second section are locked in the second position when the light guide end piece is pushed in from the first position to the second position, and wherein the second section activates a safety device when the second position is reached.

2. An adapter for the connection of a light guide end piece to a coupling device of a light source of high intensity, wherein the adapter has a first section which can be fixed in the coupling device as well as a second section which is axially slidable with respect to the first section, wherein one of the first and second sections has an input lens system, wherein the second section is axially displaceable with respect to the first section between first and second positions, wherein the light guide end piece as well as the second section are locked in the second position when the light guide end piece is pushed in from the first position to the second position, and wherein the length of the section projecting into the coupling device in the first position, is dimensioned such that safety devices in the coupling device which detect a complete pushing-in of the light guide end piece are not yet achieved.

3. An adapter for the connection of a light guide end piece to a coupling device of a light source of high intensity, wherein the adapter has a first section which can be fixed in the coupling device as well as a second section which is axially slidable with respect to the first section, wherein one of the first and second sections has an input lens system, wherein the second section is axially displaceable with respect to the first section between first and second positions, wherein the light guide end piece as well as the second section are locked in the second position when the light guide end piece is pushed in from the first position to the second position, and wherein the length of the section projecting into the coupling device when in the second position is dimensioned such that the input lens system is situated in the pivot (P) of an adjustment swivelling and/or tilting of the coupling device.

4. An adapter arrangement for the connection of a light end piece to a coupling device of a light source of high intensity, comprising:
a first adapter section,
a second adapter section which is supported for axial movement with respect to the first adapter section between first and second positions,
an input lens system at one of the first and second adapter sections,
said light guide end piece being operable to move the first and second adapter sections from the first position to the second position upon axial insertion of the light end piece in the adapter,
and a safety device for controlling actuation of the light source in response to movement of the first and second adapter sections to the second position.

5. An adapter arrangement according to claim 4, comprising locking means for locking the light end piece in the adapter in response to said axial insertion of the light guide end piece.

6. An adapter arrangement according to claim 4, wherein the first and the second sections are respective sleeves which can be telescopically slid into one another and which are held in the first position by means of a spring.

7. An adapter arrangement according to claim 4, wherein the first section has a locking device for the light guide end piece in the second position, and wherein the second section has a stop for the light guide end piece at a defined distance with respect to the input lens system.

8. An adapter arrangement according to claim 6, wherein the first section has a locking device for the light guide end piece in the second position, and wherein the second section has a stop for the light guide end piece at a defined distance with respect to the input lens system.

9. An adapter arrangement according to claim 5, wherein the first and the second sections are respective sleeves which can be telescopically slid into one another and which are held in the first position by means of a spring.

10. An adapter arrangement according to claim 5, wherein the first section has a locking device for the light guide end piece in the second position, and wherein the second section has a stop for the light guide end piece at a defined distance with respect to the input lens system.

11. An adapter arrangement according to claim 4, wherein the length of the section projecting into the coupling device in the first position is dimensioned such that safety devices in the coupling device which detect a complete pushing-in of the light guide end piece are not yet activated.

12. An adapter arrangement according to claim 5, wherein the link of the section projecting into the coupling device in the first position is dimensioned such that safety devices in the coupling device which detect a complete pushing-in of the light guide end piece are not yet activated.

13. An adapter arrangement according to claim 12, wherein the first and the second sections are respective sleeves which can be telescopically slid into one another and which are held in the first position by means of a spring.

14. An adapter arrangement according to claim 10, wherein the link of the section projecting into the coupling device in the first position is dimensioned such that safety devices in the coupling device which detect a complete pushing-in of the light guide end piece are not yet activated.

15. An adapter arrangement according to claim 4, wherein the length of the section projecting into the coupling device when in the second position is dimensioned such that the input lens system is situated in the pivot (P) of an adjustment swivelling and/or tilting the coupling device.

16. An adapter arrangement according to claim 5, wherein the length of the section projecting into the coupling device when in the second position is dimensioned such that the input lens system is situated in the pivot (P) of an adjustment swivelling and/or tilting the coupling device.

17. An adapter arrangement according to claim 7, wherein the length of the section projection into the coupling device when in the second position is dimensioned such that the input lens system is situated in the pivot (P) of an adjustment swivelling and/or tilting the coupling device.

* * * * *